United States Patent
Goodwin et al.

(10) Patent No.: US 11,161,976 B2
(45) Date of Patent: Nov. 2, 2021

(54) PHENOLIC EPOXY SYSTEM

(71) Applicant: Hexion Inc., Columbus, OH (US)

(72) Inventors: Kimberly Goodwin, Georgetown, IN (US); Ganapathy S. Viswanathan, Louisville, KY (US); Scott Peace, Louisville, KY (US); Anthony Maiorana, Nashua, NH (US); Vishal Patil, Louisville, KY (US)

(73) Assignee: HEXION VAD LLC, Louisville, KY (US)

( * ) Notice: Subject to any disclaimer, the term of this patent is extended or adjusted under 35 U.S.C. 154(b) by 0 days.

(21) Appl. No.: 16/445,043

(22) Filed: Jun. 18, 2019

(65) Prior Publication Data

US 2020/0399461 A1    Dec. 24, 2020

(51) Int. Cl.

| | | |
|---|---|---|
| *C08L 63/04* | (2006.01) | |
| *C08L 61/12* | (2006.01) | |
| *C09D 163/04* | (2006.01) | |
| *C09D 161/12* | (2006.01) | |
| *C09J 163/04* | (2006.01) | |
| *C09J 161/12* | (2006.01) | |
| *C09J 5/06* | (2006.01) | |
| *C09D 5/03* | (2006.01) | |

(52) U.S. Cl.
CPC .............. *C08L 63/04* (2013.01); *C08L 61/12* (2013.01); *C09D 5/03* (2013.01); *C09D 161/12* (2013.01); *C09D 163/04* (2013.01); *C09J 5/06* (2013.01); *C09J 161/12* (2013.01); *C09J 163/04* (2013.01); *C09J 2461/00* (2013.01); *C09J 2463/00* (2013.01)

(58) Field of Classification Search
CPC ........... C08L 63/04; C08L 61/12; C09D 5/03; C09D 161/12; C09D 163/04; C09J 5/06; C09J 161/12; C09J 163/04; C09J 2461/00; C09J 2463/00
USPC ........................................................ 525/396
See application file for complete search history.

(56) References Cited

U.S. PATENT DOCUMENTS

| | | | | |
|---|---|---|---|---|
| 4,360,608 A | * | 11/1982 | Hijikata | C08G 8/36 523/400 |
| 4,798,848 A | * | 1/1989 | Diethelm | C08J 9/10 521/121 |

* cited by examiner

*Primary Examiner* — David T Karst
(74) *Attorney, Agent, or Firm* — Edmonds & Cmaidalka, P.C.

(57) ABSTRACT

The embodiments described herein generally relate to methods and chemical compositions of phenolic epoxy systems. In one embodiment, a composition comprising a phenolic epoxy resin system includes an epoxy resin component and an alkoxylated phenol-aldehyde novolac resin.

20 Claims, No Drawings

PHENOLIC EPOXY SYSTEM

FIELD OF THE INVENTION

This invention relates to phenolic epoxy systems and methods for making these systems.

BACKGROUND OF THE INVENTION

Phenolic resins are used in variety of market segments such as friction, abrasives, refractory, non-woven composites, and as wood binders, among other uses. A traditional problem facing these industries are volatile emissions produced during the cure of the phenolic resin. These emissions can cause voids and defects in the final articles where the phenolic resin is the binder material. This is a leading cause of scrap generation across multiple markets and a low emission or emission free phenolic resin is thus highly desirable.

A current method for accommodating phenolic resin emissions is a "bump cycle", which allows volatiles to escape during the curing process. Bump cycles lead to increased processing time, temperature variations, and defects in the final products. Epoxy-novolac binder systems are well known for either low or no emissions during processing. However, epoxy-novolac binders have not resulted in immediate and widespread commercial success.

Issues that preclude the use of epoxy-novolac binders are high cost and high curing temperatures, such as about greater than 250° C. Typically, formulators and end users can reduce curing temperatures in epoxy-novolac binder systems by conventional epoxy-novolac resin curing catalysts such as imidazoles. While the use of 2-methyl imidazole reduces the curing temperature of epoxy-novolac binders, it can lead to a sacrifice of material properties with respect to modulus, glass transition temperature, and char yield, among others. Additionally, the use of small molecule catalysts like 2-methyl imidazole presents potential leaching hazards in the final article overtime since catalysts do not take part in reactions but remain in the product.

Thus, there is a need to develop systems that can combine the best of both phenolic and epoxy resins without the use, or minimal use, of external catalysts.

SUMMARY OF THE INVENTION

In one embodiment, a composition is provided comprising a phenolic epoxy resin system including an epoxy resin component and an alkoxylated phenol-formaldehyde resin. An optional curing agent may be used with the phenolic epoxy resin system.

In another embodiment of the present invention, there is disclosed a composition comprising a phenolic epoxy resin system includes an epoxy resin component and a reaction product of at least a phenol-aldehyde resin and an alkoxylation agent (and an optional catalyst). An optional curing agent may be used with the phenolic epoxy resin system.

In another embodiment, the phenolic epoxy resin system is prepared by a process comprising, consisting of, or consisting essentially of: reacting a phenol-aldehyde resin and an alkoxylation agent selected from the group consisting of an alkylene oxide, an alkylene carbonate, and combinations thereof, optionally in the presence of a catalyst, to form an alkoxylated phenol-aldehyde resin, and blending and/or reacting the alkoxylated phenol-aldehyde resin with an epoxy resin component, optionally in the presence of a curing agent.

In another embodiment, a reaction product is prepared by a process comprising, consisting of, or consisting essentially of: reacting a phenol-aldehyde resin and at least one an alkoxylation agent, to form an alkoxylated phenol-aldehyde resin compound, which optionally, may be in the presence of a catalyst. The alkoxylation agent may be an alkylene oxide, an alkylene carbonate, or combinations thereof.

In another embodiment, a composition is provided comprising a phenolic epoxy resin system including an epoxy resin component and a reaction product of at least a phenol-aldehyde novolac resin and an alkoxylation agent selected from the group consisting of an alkylene oxide, an alkylene carbonate, and combinations thereof, and an optional catalyst. An optional curing agent may be used with the phenolic epoxy resin system.

In another embodiment of the invention, a process is provided including reacting a phenol-aldehyde resin and an alkoxylation agent selected from the group consisting of an alkylene oxide, an alkylene carbonate, and combinations thereof, and an optional catalyst, to form an alkoxylated phenol-aldehyde resin and reacting the alkoxylated phenol-formaldehyde resin and an epoxy resin component, optionally in the presence of a curing agent.

DETAILED DESCRIPTION OF THE INVENTION

Embodiments of the invention are directed to phenolic epoxy systems, methods for making the phenolic epoxy systems, and the use of phenolic epoxy systems in the manufacture of composites, liquid coatings, hot melt adhesives, molding powders, powder coatings, and combinations thereof, among others.

A phenolic epoxy system as described herein may include an epoxy resin component and an alkoxylated phenol-formaldehyde resin, and an optional curing agent. The alkoxylated phenol-formaldehyde resin may comprise a reaction product of at least a phenol-aldehyde resin and an alkoxylation agent, and optionally, a catalyst. The alkoxylation agent may be selected from the group consisting of an alkylene oxide, an alkylene carbonate, and combinations thereof.

The phenolic epoxy resin system, the reaction product, or both may be free of a catalyst, free of a curing agent, or both. Each of the phenolic epoxy resin system, the reaction product of at least a phenol-aldehyde novolac resin and an alkoxylation agent (and optionally a catalyst), the epoxy resin component and the optional curing agent, may be a solid.

In one embodiment, the phenolic epoxy systems may involve the blending, mixing, contacting, or reacting (or one or more of blending, mixing, contacting, or reacting process steps) of alkoxylated novolac resins, preferably partially alkoxylated novolac resins, with an epoxy resin and an optional curing agent.

Methods of this blending, mixing, or contacting can occur through a variety of processes such as grinding in a suitable mill such as a hammer or air mill to produce a powder where the particle sizes can range from 0.1 um to 1 mm in size. Alternatively, the compositions can be blended with the use of a suitable solvent that can dissolve both the partially alkoxylated novolac resin, the epoxy resin, and the optional curing agent. The solvent based composition can then be spray dried to produce a powdered substance or it can be used with the solvent in coatings applications. The compositions in this invention are preferred to be powders, but can also be utilized as liquids either in a solvent, reactive diluent, or at a temperature where the composition exhibits liquid behavior.

The epoxy resin component of the invention may include any suitable solid epoxy resin. Epoxy resins are those compounds containing at least one vicinal epoxy group. The solid epoxy resin may be saturated or unsaturated, non-aromatic, aromatic or heterocyclic and may be substituted. The solid epoxy resin used in the processes and compositions described herein may include one or more solid epoxy resins.

A solid epoxy resin is defined as an epoxy resin with a viscosity above 7 cP at 25° C. with a melting point above 25° C., such as 50° C. or higher. The solid epoxy resin may also be monomeric or polymeric. The solid epoxy resin may have weight per epoxy equivalent (WPE) values of about 180 to about 10,000. The solid epoxy resin component comprises from about 20 percent by weight (wt. %) to about 70 wt. %, such as from about 40 wt. % to about 60 wt. % of the phenolic epoxy resin system.

Illustrative of the epoxy resins, there may be mentioned those of diglycidyl ether resins, such as those having the above mentioned WPE values, prepared by contacting a hydroxyl compound, such as a monohydroxy or a polyhydroxy compound, with an excess of epichlorohydrin under basic conditions, such as in an alkaline reaction medium or in the presence of a suitable base, such as an alkali metal hydroxide. The hydroxy compound may be bisphenol A, brominated bisphenol A, bisphenol F, bisphenol Z, bisphenol G, bisphenol S, resorcinol, neopentyl glycol, cyclohexanedimethanol, and combinations thereof. Preferred epoxy resins are based on or derived from the dihydroxy compound involved, for example bisphenol A. Examples of suitable solid epoxy resins include, but are not limited to glycidylized novolacs, glycidylized novolacs containing alkyl phenols, and the reaction products of bisphenol A and the digylcidyl ether of bisphenol A or other suitable bisphenol analogs such as bisphenol F, bisphenol G, bisphenol Z, and bisphenol S. For the glycidylized novolacs containing alkyl phenols, the alkyl phenols may be phenolic compounds having two or more substituent groups of alkyl group, aryl group, alkenyl group or combinations thereof, for example, cresols, xylenol, and combinations thereof. Examples of suitable alkyl phenols include o-cresol, p-cresol, m-cresol, xylenol, nonyl-phenol, octyl phenol, butyl phenol, cardanol, cardol, propyl phenol, ethyl phenol, hepty phenol, and combinations thereof.

Additionally, suitable epoxy resins may be produced through epoxidation of alkene bonds through peroxyacids to generation epoxide groups and subsequently epoxy resins. Suitable alkene containing molecules may be diallyl bisphenol A, diallyl bisphenol F, diallyl bisphenol Z, diallyl bisphenol G, allylated novolacs divinyl benzene, meta-isopropylene benzene, and unsaturated vegetable oils such as soybean oil, castor oil, and flaxseed oil.

The peroxyacids suitable for epoxidation may be derived from formic, acetic, propionic, butyric, caprylic, m-chlorobenzoic acid, and benzoic acid. Generation of the peroxyacid can occur through direct oxidation with a peroxide such as hydrogen peroxide or through biocatalytic routes such as activation of a suitable organic acids such as formic, acetic, propionic, butyric, caprylic, m-chlorobenzoic acid, and benzoic acid through lipases and further oxidation through hydrogen peroxide or generation of peroxides through oxidase enzymes such as glucose oxidase, cytochrome P450s, and laccases.

Reactive diluents for the epoxy compositions may also be present in the epoxy compositions to lower viscosity and improve handling characteristics. Examples of reactive diluents include neopentylglycol diglycidyl ether, butanediol diglycidyl ether, resorcinol diglycidyl ether, cyclohexane dimethanol diglycidyl ether, and combinations thereof.

Commercial examples of suitable solid epoxy resins include, but are not limited to, EPON™ Resins 164, 165, 1001, 1002, 1004, 1007, and 1009, commercially available from Hexion Inc., of Columbus, Ohio.

Optionally, the epoxy system may include a curing agent. The curing agent may be an amine, a formaldehyde donor, an oxygen-containing heterocyclic compound, an imidazole, and combinations thereof. In one embodiment, the amine includes tertiary amines, such as triethanol amine, tributyl amine, and combinations thereof. In one embodiment, the amine includes heterocyclic compounds such as hexamethylenetetramine (also known as, and referred herein as, hexamine), oxazolidine, and combinations thereof. A formaldehyde donor (formaldehyde releaser) is a chemical compound that slowly releases formaldehyde as it decomposes in a composition, and examples include oxazolidine, paraformaldehyde, and combinations thereof. An example of an oxygen-containing heterocyclic compound is trioxane. Examples of the imidazole compound include 2-methyl imidazole, imidazole, and combinations thereof. Examples of suitable curing agent may include material selected from the group consisting of hexamethylenetetramine (hexamine), oxazolidine, paraformaldehyde, trioxane, 2-methyl imidazole, imidazole, melamine, triethanol amine, tributyl amine, and combinations thereof.

The curing agent may comprise from between about 0 wt. % and about 5 wt. % of the total amount of the phenolic epoxy resin system. If present, the curing agent may comprise from between about 0.05 wt. % and about 5 wt. %, such as from about 1 wt. % to about 3 wt. % of the total amount of the phenolic epoxy resin system. The curing agent may be in the form of a powder, and may be blended with phenol-aldehyde resin described herein, which blending may be prior to contacting with an epoxy resin component.

The phenol-aldehyde resins, including modified phenol-aldehyde resins, may be used in the reaction product of the epoxy system descripted here. The phenol-aldehyde resins component comprises from about 30 percent by weight (wt. %) to about 80 wt. %, such as from about 40 wt. % to about 60 wt. % of the phenolic epoxy resin system.

For clarity in describing the invention to one skilled in the art, a phenol-formaldehyde resin will be used in the following description, however, the use of the phenol-formaldehyde resin as a preferred embodiment is not meant to narrow the scope of the invention.

The phenol-formaldehyde resin may also be in the form of novolac and resole resins. For forming the phenol-formaldehyde resins described herein, novolacs when prepared using an acid catalyst and resole resins are formed when prepared using a base catalyst. Examples of suitable acid catalyst include hydrochloric acid, sulfuric acid, phosphoric acid, oxalic acid, sulfonic acid, sulfamido acids, haloacetic acids, and combinations thereof. Examples of suitable base catalysts include sodium hydroxide, barium hydroxide, potassium hydroxide, calcium hydroxide, organic amines, aqueous ammonia, sodium carbonate, sodium sulfite, and combinations thereof. For example, in one embodiment, an acid catalyst used to prepare the phenol formaldehyde resins of the application may be p-toluene sulfonic acid or dodecylbenzensulfonic acid.

Also, with the reaction of phenol monomers with aldehydes to prepare phenol-formaldehyde resins, the molar ratio of the reactants used in reaction may, in some embodiments, determine the molecular structure and physical properties of the resin. When it is desirable to prepare a novolac type resin, an aldehyde:phenol molar ratio between 0.1:1 and 1:1, such as 0.35:1 to 0.95:1, for example from 0.7:1 to 0.85:1 with an acid catalyst will form novolac resins, which are thermoplastic in character. A higher aldehyde:phenol ratio, for example, more than 1:1 to 4:1, with a base catalyst will form resole resins, which are characterized by their ability to be thermally hardened at elevated temperatures. In one example, a phenol and a formaldehyde are reacted under conditions such that the molar excess of phenol is always greater than that of formaldehyde in the presence of a suitable catalyst. An example of a molar ratio of formaldehyde to phenol is anywhere from 0.1 to 0.95.

Commercial examples of suitable phenol-aldehyde include, but are not limited to, Bakelite® PF 6065, Bakelite® 01109, Bakelite® 0970K01, Bakelite® 0744, Durite™ PD-427, Durite™ PD-6564, Durite™ SD-1731, which are commercially available from Hexion Inc., of Columbus, Ohio.

The phenol-aldehyde resins may be reacted with at least one alkoxylation agent to form the alkoxylated phenol-aldehyde resin. The alkoxylation agent may be alkylene oxide, alkylene carbonate, or a combination thereof. The phenol-aldehyde resins resin may be a novolac phenol formaldehyde resin.

For such a reaction, the phenol-aldehyde resins may comprise from about 59 wt. % to about 90 wt. %, such as from about 70 wt. % to about 80 wt. %, of the reaction components, and the alkoxylation agent may comprise from about 10 wt. % to about 41 wt. %, such as from about 20 wt. % to about 30 wt. % of the reaction components. In a preferred embodiment, the alkoxylation agent is present in an amount to provide for up to 100% alkoxylation, such as from about 10% to about 50% alkoxylation of the phenol-aldehyde resin.

Optionally, the alkoxylation reaction may be in the presence of a catalyst. The alkoxylation catalyst may comprise from between 0 wt. % and 5 wt. % of the total amount of the phenol-aldehyde resin and the alkoxylation agent components. If present, the catalyst may comprise from between 0.1 wt. % and 5 wt. % of the total amount of the phenol-aldehyde resin and the alkoxylation agent components.

The alkoxylation agent may be alkylene oxide, alkylene carbonate, or a combination thereof.

Suitable alkylene oxides may comprise linear aliphatic alkylene oxides, branched aliphatic alkylene oxides, cyclic aliphatic alkyene oxides, aromatic alkylene oxides, alkyl aromatic alkylene oxides, alkylene oxides with ethers (commonly known as glycidyl ethers), and alkylene oxides with esters (commonly known as glycidyl esters).

Examples of suitable alkylene oxides can be one or more alkylene oxides selected from the group comprising ethylene oxide, propylene oxide, glycidol, styrene oxide, epichlorohydrin, butylene oxide, isobutyleneoxide, cyclohexane oxide, 2,3-epoxyhexane, allyl glycidyl ether, methyl glycidyl ether, butyl glycidyl sulfide, glycidyl methyl sulfone, glycidyl methacrylate, glycidyl allyl phthalate, and combinations thereof. Examples of preferred alkylene oxides include compounds selected from the group consisting of ethylene oxide, propylene oxide, butylene oxide, and combinations thereof.

Suitable alkylene carbonates may comprise linear aliphatic alkylene carbonates, branched aliphatic alkylene carbonates, aromatic alkylene carbonates, alkyl aromatic alkylene carbonates, alkyl hydroxide carbonates, vinyl carbonates, acrylic carbonates, and ester carbonates. Examples of preferred alkylene carbonates may include one or more alkylene carbonate selected from the group comprising ethylene carbonate, propylene carbonate, butylene carbonate, glycerol carbonate, styrene carbonate, 1-chloro-propylene carbonate, isobutylene carbonate cyclohexene carbonate, allyl carbonate, methacrylate carbonate, vinyl carbonate, allyl phthalate carbonate, and combinations thereof. Examples of preferred alkylene carbonates include compounds selected from the group consisting of ethylene carbonate, propylene carbonate, butylene carbonate, and combinations thereof.

Suitable alkylene carbonate can be prepared from suitable mono-epoxide compounds such as ethylene oxide, propylene oxide, glycidol, styrene oxide, epichlorohydrin, butylene oxide, isobutyleneoxide, cyclohexane oxide, 2,3-epoxyhexane, allyl glycidyl ether, methyl glycidyl ether, butyl glycidyl sulfide, glycidyl methyl sulfone, glycidyl methacrylate, glycidyl allyl phthalate.

An alkoxylated phenol-aldehyde (novolac) resin, such as a partially alkoxylated novolac, is produced by first producing a novolac resin as described herein and exposing it to an alkoxylating process as follows.

Once a novolac resin has been formed, a suitable catalyst may be added to the novolac at an elevated temperature in order to have a free flowing novolac liquid and to promote the reaction between the novolac and a suitable alkoxylating agent. The reaction temperature may be anywhere from about 50° C. to about 270° C. with a preferred range from about 75° C. to about 175° C. and a more preferred range from about 100° C. to about 165° C. Examples of an elevated temperature in which all the components are liquids could range anywhere from about 25° C. to about 150° C. with a preferred range from about 60° C. to about 110° C. and a more preferred range from about 70° C. to about 90° C.

In order to produce a partially alkoxylated novolac there should be an excess of reactive sites compared to alkoxylating agent. The reaction conditions can also include a reaction pressure in the range of from about 0.01 bar to about 100 bar. Any and all pressures within the range of from 0.01 bar to 100 bar are included herein and disclosed herein; for example, the reaction pressure can be from about 0.1 bar to about 50 bar, from about 0.5 bar to about 20 bar, or from about 1 bar to about 10 bar.

A preferred concentration of alkoxylating agent:reactive site is anywhere from 0.1:1 to 0.9:1.

The components can be added together in any suitable manner. For example, the reaction can take place in a batch system, a continuous system, a semi-batch system, or a semi-continuous system.

The alkoxylating process of the invention may be conducted in a suitable solvent. Suitable solvents are those that dissolve the reactants and the product and are themselves inert in the process. After the reaction, such solvents can be removed from the reaction mixture through a distillation process. Examples of suitable solvents include, but are not limited to, methyl isobutyl ketone, methyl ethyl ketone, methyl amyl ketone, ethyl acetate, n-butyl acetate, propyl acetate, methyl acetate, acetone, n-methyl pyrrolidone, n-butanol, ethanol, methanol, propanol, allyl alcohol, toluene, and combinations thereof.

In other embodiments, the alkoxylation of phenol-aldehyde resin can be carried out in the presence of reactive diluents. Example of reactive diluents that can be used include, but are not limited to furfuryl alcohol, resoles, monofunctional epoxides such as the glycidyl ether of phenol, glycidyl ether of o-cresol, glycidyl ether of p-cresol, glycidyl ether of m-cresol, glycidyl esters of aliphatic acids, and combinations thereof. Alkoxylation agents can be reacted with both the reactive diluent and the phenol-aldehyde resin to yield liquid materials of various viscosities.

Optionally, the reaction between the phenol-aldehyde resin and the alkoxylation agent can take place in the presence of an alkoxylation catalyst. Suitable alkoxylation catalysts include metal hydroxides, metal carbonates, metal phosphates, tertiary amines, phosphines, transition metal bases, organic acids, inorganic acids, and combinations thereof. Examples of catalysts that can be used include, but are not limited to sodium hydroxide, potassium hydroxide, lithium hydroxide, ammonium hydroxide, magnesium hydroxide, calcium hydroxide, barium hydroxide, sodium carbonate, sodium bicarbonate, potassium carbonate, potassium bicarbonate, potassium phosphate, sodium phosphate, lithium phosphate, zinc acetate, magnesium acetate, and combinations thereof. Examples of organic acids include oxalic acid, formic acid, acetic acid, trifluoroacetic acid, methane sulfonic acid, salicylic acid, benzoic acid, adipic acid, or p-toluenesulfonic acid; and examples of inorganic acids include hydrochloric acid, sulfuric acid, phosphoric acid, and combinations thereof. The organic acids and inorganic acids can also be used to neutralize the reaction mixture.

The manufacturing of the phenol-aldehyde resin and forming the alkoxylated phenol-aldehyde resin can be carried out in the same reactor or different reactors. The manufacturing of phenol-aldehyde resin and/or forming the alkoxylated phenol-aldehyde resin may be carried out in a continuous, semi-continuous, semi-continuous to batch, or batch type process and/or reactor.

The compositions described herein may be blended with the use of a suitable solvent that can dissolve both the partially alkoxylated novolac resin, the epoxy resin, and the optional curing agent. The solvent based composition can then be spray dried to produce a powdered substance or it can be used with the solvent in coatings applications. The compositions in this invention are preferred to be powders, but can also be utilized as liquids either in a solvent, reactive diluent, or at a temperature where the composition exhibits liquid behavior.

The solid epoxy resin is combined with solid alkoxylated novolac resin by mixing via grinding, blending, or a combination thereof, or otherwise mechanically integrating the two solids into a single powder.

In one example of a grinding and blending procedure includes a resin ground in a grinder to a specific particle size, and can be optionally ground with a catalyst, such as a hexamine catalyst or an acid catalyst, a resin system, such as an epoxy system, or with filler materials. Next, the ground material, with a catalyst, such as a hexamine catalyst or an acid catalyst, a resin system, such as an epoxy system, or with filler materials, is provided to a blender and a homogenous blend is formed.

In one embodiment, an alkoxylated resin as described herein (with or without an epoxy resin or system and any other desired additives as described herein), are charged to a laboratory grinder or mill, and are ground together until a powder was produced where more than 95% of the powder passed through a 200 mesh screen (screen openings of about 74 μm or 0.0029 inches). Next, the ground material is transfer to a blender, such as a blending jar. Any additional desired chemical additives can be added to the blender. The blending is performed and continues, at intervals with agitating the blender to release buildup on blender sides, until desired amount of blending is complete. The processes can be performed at atmospheric conditions and room temperature.

The solid phenolic epoxy composition as described herein can be added to other components, such as those used for brake pads, brake pads, drum brake linings, refractory bricks, bonded abrasive wheels, acoustical insulation, wherein the compositions vary on application and can include: inorganic fibers, organic fibers, inorganic fillers, organic fillers, metals, lubricants, rubbers, minerals, graphite, resins, and abrasive grains.

Pressing and molding is done either with or without the addition of heat. In one embodiment, to obtain a final article that exhibits suitable properties, phenolic epoxy resin can be cured during hot pressing and during a baking cycle in an oven with temperatures from 70° C. to 350° C., with a preferable range being from 90° C. to 200° C. Temperature ramp and hold times are largely dependent on thermal conduction through the final article and are a function of the final article size and composition.

The solid compositions of this invention are preferred and are intended to be utilized as a binder for non-woven composite materials such as brake pads, drum brake linings, refractory bricks, bonded abrasive wheels, acoustical insulation.

The liquid compositions of this invention could be utilized for protective coatings, paper saturation for filtration, paper saturation for laminate construction, binder in coated abrasives, and mineral wool insulation.

Bonded abrasives or binder in coated abrasives may be made in one embodiment, by premixing a wetting agent (liquid resin and/or furfuryl alcohol) with an abrasive grain for a period of time and consistency that is satisfactory for complete grain coverage. Minimal amount of liquid resin is used to achieve the final desired mix consistency. The bond is mixed together and consists of the ethoxylated novolac—epoxy and fillers such as: calcium carbonate, potassium fluoroborate, magnesium oxide, iron sulfides(pyrites), iron oxide, potassium sulphate, potassium chloride, zinc sulphate, zinc sulfide, cryolite, feldspar, silicates, antimony trisulfide, et al. The above two mixtures are combined in an Elrich type mixer for a period of time that is satisfactory for complete mixing. Periods of rest may be used to allow for dust settling. Small amounts of oil, such as castor oil or mineral oil, are used to reduce dusting. The mixture is allowed to age openly under ambient conditions for a period of time to achieve the desired mix consistency. The abrasive mix is pressed in either hot or ambient conditions. The resulting part is typically cured in an oven at temperatures >100° C. up to 210° C. using slow ramp cure cycle that can vary between 12 to 48 h and varies depending on the size of the part. The part is allowed to cool and labels may be applied.

Friction composites may be made in one embodiment by adding to a mixer, two or more compounds including binders (ethoxylated novolac-boost, phenolic resins, rubber), fibers (basalt, glass, ceramic, wollastonite, aramid, pitch, PAN, steel wool), fillers (barytes, metal oxides, kaolin, calcium carbonate, carbon black, coke, graphite, recycled "friction dusts"), metals (copper, iron, brass), and lubricants (antimony sulfide, molybdenum sulfide, graphite). Blending may be performed in an intensive mixer or kneaker mixing device. The mixture is weighed out and transferred to molds. The friction composite part is shaped by molding under heat and pressure. The part is extracted from the mold and cured in an oven at temperatures >100° C. up to 210° C., and then allowed to cool. After cooling, the part can then be machined to specification using grinding and cutting tools.

Refractory composites (bricks) may be made in one embodiment by adding to a mixer a binder (ethoxylated novolac-epoxy, novolac-hexa, resole), graphite, refractory grains (magnesia, alumina, dolomite, et al), and then mixed until a satisfactory mix consistency is achieved. The mixture can then be sent to directly to the press or aged prior to pressing. Refractory composites are molded under pressure and the composite is removed from the mold and stacked to be cured in an oven at temperatures >100° C. up to 210° C. The composite is then allowed to cool to ambient temperature, and the composite may be machined to specification using grinding and cutting tools.

Coated abrasives may be made in one embodiment by providing a substrate, such as paper, fabric, or both, and then applying the resins as described herein, such as ethoxylated novolac, to the substrate. Abrasive grains can then be applied to coated substrate. Another layer of resin is then applied on top of the grain. The substrate can then be cured in ovens >100° C. up to 210° C.

Acoustical insulation, also referred to as fiber bonding composites may be made in one embodiment by providing reinforcement fibers (glass, cellulose, cotton shoddy, poly) into an air lay line where the fibers are combined with binder to form a blanket. The binder may comprise the resins described herein, such as ethoxylated novolac and other additives in the formulation to mitigate clumping on the rollers, aid in the physical flow, and minimize dust. Additives may include calcium stearate, zinc stearate, calcium carbonate, talc, linseed oil, and mineral oil. Other additives may include semi-cure acceleration aids for processing, which may include adipic acid, fumaric acid, oxalic acid, lime, and magnesium oxide, among others. Flame retardant additives can be used in the formulation and may include monoammonium phosphate and melamine. Colorants such as carbon black and nigrozine dye may also be used. Additives for odor such as vanillin may also be used. After the blanket is formed on the rollers, the blanket travel throughs an oven with several temperature zones at a rate and temperature so that the resulting blanket at the end of the line is deemed "semi-cured". Scrim may also be applied during this stage. The "semi-cured" blanket is then rolled and transported to the molds, where it is cut to the appropriate size and hot molded at temperatures >100° C. to 210° C. for a time that is necessary to provide the desired physical properties.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

For the examples, the following methods were utilized for Examples 1-8 for the data reported in Tables 1-6.

% Water: The percentage of water remaining in the product after alkoxylation was determined by a standard Karl Fischer titration via a Karl Fischer titration apparatus which is similar to ASTM D6304.

% Alkoxylation: The percentage of reactive sites converted through alkoxylation. The percentage is based on the initial ratio of alkoxylating agent to reactive site, where the reactive site is the phenolic hydroxyl group herein. For example, if the alkoxylating agent to reactive site ratio is 0.5:1, there are 0.5 equivalents of alkoxylating agent for 1 equivalent of phenolic hydroxyl group, resulting in a degree of alkoxylation of 50%.

Differential Scanning Calorimetry (DSC): Used to determine Onset Temperature, Peak Temperature, Enthalpy, and Glass Transition Temperature (Tg). The thermal transitions of the powdered materials prepared in examples 1-8 was explored using differential scanning calorimetry with hermetically sealed aluminum pans. The samples were ramped in a heat/cool/heat cycle from −20° C. to 300° C. at 10° C./minute. In one instance Example 1 had to be re-run from −20-400° C. in order to capture the peak exotherm temperature. The exotherm observed correlates to the energy released during the polymerization. The onset and peak temperatures of the exothermic transition were reported using the TA Instruments software "Discovery." The enthalpy of the reaction was determined through integration of the exothermic transition also using the "Discovery" software. The exothermic transition was measured from the first heating curve. The glass transition temperature ($T_g$) was measured from the midpoint inflection of the heating trace on the second heating curve using the "Discovery" software.

Dynamic Rheology Results: Used to determine the Minimum Viscosity Temperature, Gel Point Temperature, Gel Time, and Shear Modulus at 250° C. A dynamic rheological gel point was determined through a dynamic method where powdered samples were prepared from compressing 0.6 grams of powder in a mold of 25 mm in diameter and 1 mm in thickness. The dynamic rheological method started at 100° C. and ramped to 250° C. at 2° C./minute under at 1% strain and 1 Hz frequency and a gap of 1 mm. A dynamic gel point was determined through the first crossover of the storage (G') and loss modulus (G") where the G' becomes more dominate than the G". The dynamic gel point was expressed both as a temperature and as a time. The shear modulus reported at 250° C. is the shear storage modulus (G') at 250° C.

Isothermal Rheological Gel Point Method: A isothermal rheological gel point was determined through an isothermal method where powdered samples were prepared from compressing 0.6 grams of powder in a mold of 25 mm in diameter and 1 mm in thickness. The rheometer was operated under strain control mode with a % strain of 1% at a frequency 1 Hz for a maximum time of 167 minutes. The gel point was determined through the first crossover of the storage (G') and loss modulus (G") where the G' becomes more dominate than the G". The ability for the rheometer to gain useful data was fully dependent on the material's ability to be molten at the specific temperature and not all samples were molten at the required temperatures in which case the data is not reported. The isothermal temperatures measured were 90, 100, 110, 120, 130, and 140° C. The rheometer used was a TA Instruments ARES G2.

Dynamic Mechanical Analysis (DMA) is a dynamic single frequency scan of the cured materials were tested to measure the alpha transition temperature ($T_\alpha \approx T_g$), which were defined by the peaks of the tan(δ) (tan(E"/E')) and loss modulus (E") and the storage modulus (E') both in the glassy region (below $T_\alpha$) and rubbery region (above $T_\alpha$). The storage modulus in both regions indicates potential performance of the materials at specific temperatures. Samples were cut from the cured panels of materials to a dimension of approximately a width of 13 mm, a length of 40 mm, and a thickness of 3 mm. A single cantilever clamp geometry was used for dynamic mechanical analysis with a temperature ramp rate of 3° C./min under normal atmospheric conditions and ambient humidity to 350° C. The alpha transition ($T_\alpha$) was measured by the peak temperature of the loss modulus (E") and the peak of the tan(δ). The glassy storage modulus is reported at 30° C. and the rubbery modulus was reported at the lowest storage modulus obtained during the test.

Thermogravimetric Analysis (TGA) was used to characterize the thermal decomposition of the materials. 40 mg of sample prepared for thermogravimetric analysis was loaded into a pre-tared aluminum pan in a TA Instruments Q50 thermogravimetric analyzer. The temperature was then ramped from ambient to 1000° C. under nitrogen atmosphere. The temperatures at weight losses of 5% and 10% were used to characterize the onset of degradation and the temperature of the peak of the % weight derivative curve was used as a peak degradation temperature. The peak degradation temperature is measured from the peak temperature of the derivative of the weight % curve. The % mass remaining at 800° C. was characterized as the % char yield. The percent char at 800° C. is a measure of the material's ability to create carbon with higher degrees of char at 800° C. being generally accepted as providing beneficial properties for high temperature stability.

TGA Sample Preparation: 2 grams of powder were made into a disc of 25 mm in diameter under 10-15 Tons of pressure over 30 seconds. The powder disc was then wrapped into aluminum foil and 4 KG of a metal block is placed on the disc into an oven at ambient temperature and then ramped to 155-160° C. at an uncontrolled rate and held at 155-160° C. for 1 hour and then ramped to 175° C. for 5 hours and then cooled to ambient conditions. The cured disc was then broken into smaller pieces using a mortar and pestle and then sieved through a 12 mesh screen and particles that were larger than a 20 mesh screen were collected.

For the following examples, the chemicals are described as follows:

"PF Resin" is a novolac phenol formaldehyde resin having a functionality of about 6.

"Epoxy" is a solid epoxy resin and is a glycidyl ether of an ortho cresol novolac with a weight per epoxy equivalent (WPE) of 200-240, available in a physical form of a flake, and is commercially available under the tradename of EPON™ 165 or 164 from Hexion Inc.

Hexa is a hexamethylenetetramine, and is commercially available under the name Hexamine Granular from Hexion Inc.

Bakelite® FD-G128 is a commercial solid novolac hexamine composition that is sold by Hexion Inc. and essentially consists of a solid novolac resin and granular hexamine being pulverized in a grinder until 96.5 to 99.5% of all the particles are less than or equal to 74 um and where the hexamine is at a concentration of 7-9% and the novolac consists of 91-93%.

"2-MI" or "MI-2" is methyl imidazole or methyl imidazole.

General Process for Making a Novolac: 90 parts of phenol are charged to a reactor equipped with a mechanical agitator, reflux condenser, thermocouple controlled heating apparatus, and a formaldehyde weigh tank. Next, anywhere from about 0.1 to 1 part of oxalic acid is charged to the reactor, which is then brought to 100° C. and 48 parts of formaldehyde are charged slowly over an hour. Next, the reactor is atmospherically distilled to 160° C. and then vacuum distilled to 190° C. for 1 hour. Then, the finished phenol-aldehyde condensate or novolac is discharged to a surge tank and then a flaker belt to produce novolac flake also known as PF Resin.

General Process for grinding/blending two powders together: PF Resin and Epoxy, and any other desired additives, are charged to a laboratory grinder or Mill, such as the Microanalytical Tekmar A-10 device, and are ground together until a powder was produced where more than 95% of the powder passed through a 200 mesh screen (screen openings of about 74 µm or 0.0029 inches). Samples are removed from the grinder and transfer to blending jar. Any additional desired chemical additives can be added with 2-10 mm ball bearings to the jar. The jar is sealed and placed on roller at 20-50 revolutions per minute for 10 minutes. At intervals, agitate jar to release buildup on sides and continue blending until desired amount of blending is complete.

General Process for Preparation of Partially Alkoxylated Novolac Resin: 69.948 parts of a phenol formaldehyde condensate in the form of a flake was added to a 4 necked 1000 mL round bottom flask equipped with a mechanical agitator, reflux condenser, and a thermocouple controlled heating mantle. The phenol formaldehyde condensate was brought to 175° C. and 0.335 parts of potassium carbonate was then added and mixed for 5 minutes followed by a dropwise addition of molten ethylene carbonate over 4 hours while maintaining a temperature of 165-185° C. Finally, 0.665 parts of salicylic acid was added to the reactor to neutralize the reactor mixture and the partially alkoxylated resin was then flaked to yield a brown to light yellow material. Yields were between 85-98% of the theoretical yield.

For the following examples: Preparation of Partially Alkoxylated Novolac Resin: 1250 grams of an oxalic catalyzed phenol-formaldehyde novolac resin with a viscosity of 900+/−200 mPa·s at 175° C. and 3.1 grams of potassium carbonate were heated to 175° C. to form a molten mixture with physical agitation and then 518.8 grams of ethylene carbonate was added over 4 hours and then held at 175° C. for 4 hours. 6.2 grams of salicylic acid was then added to neutralize to partially alkoxylated novolac resin. The molten partially alkoxylated novolac resin was then poured into a metal pan and crushed to produce smaller particles. The weight average molecular weight was 3240 g/mol, the dispersity index was 4.1, and the viscosity was 2480 mPa·s at 150° C.

Example 1 (Control 1)

13.48 grams of a solid epichlorohydrin o-cresol-formaldehyde condensate and 6.52 grams of an oxalic catalyzed novolac resin with a viscosity of 960-1700 mPa·s at 175° C. were mixed in a grinder under ambient conditions until a powder was produced with a particle size of 90% through a 200 mesh screen.

Example 2 (Control 2)

13.48 grams of a solid epichlorohydrin o-cresol-formaldehyde condensate, 6.52 grams of an oxalic catalyzed novolac resin with a viscosity of 960-1700 mPa·s at 175° C., and 0.04 grams of 2-methyl imidazole were mixed in a grinder under ambient conditions until a powder was produced with a particle size of 90% through a 200 mesh screen.

Example 3 (Control 3)

13.480 grams of a solid epichlorohydrin o-cresol-formaldehyde condensate, 6.520 grams of grams of an oxalic catalyzed novolac resin with a viscosity of 960-1700 mPa·s at 175° C., and 0.2 grams of 2-methyl imidazole were mixed in a grinder under ambient conditions until a powder was produced with a particle size of 90% through a 200 mesh screen.

Example 4 (Control 4)

92 grams of an oxalic catalyzed novolac resin with a viscosity of 960-1700 mPa·s at 175° C. and 8 grams of granular hexamine. The mixture of powdered PF Resin and Hexamine is a commercially available sample under the tradename Bakelite® FD-G128.

Example 5

9.348 grams of a solid epichlorohydrin o-cresol-formaldehyde condensate and 10.652 grams partially alkoxylated novolac resin were mixed in a grinder under ambient conditions until a powder was produced with a particle size of 90% through a 200 mesh screen.

Example 6

11.748 grams of a solid epichlorohydrin o-cresol-formaldehyde condensate, 3.067 partially alkoxylated novolac resin, and 5.184 grams of an oxalic catalyzed novolac resin with a viscosity of 960-1700 mPa·s at 175° C. were mixed in a grinder under ambient conditions until a powder was produced with a particle size of 90% through a 200 mesh screen.

Example 7

68.005 grams of a solid epichlorohydrin o-cresol-formaldehyde condensate, 77.495 grams of partially alkoxylated novolac resin with a viscosity of 2480 mPa·s at 150° C., and 4.5 grams of granular hexamine were mixed in a grinder under ambient conditions until a powder was produced with a particle size of 90% through a 200 mesh screen.

Example 8

85.470 a solid epichlorohydrin o-cresol-formaldehyde condensate, 22.316 grams of partially alkoxylated novolac resin, and 37.713 grams of an oxalic catalyzed novolac resin with a viscosity of 960-1700 mPa·s at 175° C. and 4.50 grams of granular hexamine were mixed in a grinder under ambient conditions until a powder was produced with a particle size of 90% through a 200 mesh screen.

The preparation of cured materials for Examples 2 and 3 are as follows: powders were distributed on an aluminum foil tray at 170° C. until foaming of the powder was observed, which ranged from 5-7 minutes and were then mixed in a grinder and sieved through a 200 mesh screen. The sieved powder was then cured at 170° C. for 1 hour under with a gradual pressure increase from 0 to 20 Tons at a rate of 2 Tons/min while under 27 inches of Hg.

The preparation of panels of cured materials for Examples 1, 5-8 are as follows: Powders were distributed on an aluminum foil tray at 125-128° C. until foaming of the powder was observed, which ranged from 5-7 minutes and were then mixed in a grinder and sieved through a 200 mesh screen. The sieved powder was then cured at 170° C. for 1 hour under with a gradual pressure increase from 0 to 20 Tons at a rate of 2 Tons/min while under 27 inches of Hg.

The preparation of panels of cured materials for Examples 4 is as follows: Powders were distributed on an aluminum foil tray at 160° C. until foaming of the powder was observed, which ranged from 4 minutes and were then mixed in a grinder and sieved through a 200 mesh screen. The sieved powder was then cured at 170° C. for 1 hour under with a gradual pressure increase from 0 to 20 Tons at a rate of 2 Tons/min while under 27 inches of Hg.

For the following examples, "N/A" means no values were generated.

Examples 1-8 summarized parameters listed in Table 1.

TABLE 1

| Examples | Resin System | % Alkoxylation | Catalyst (2-Methyl Imidazole) | Catalyst Hexa (%) |
|---|---|---|---|---|
| 1 (Control) | PF Resin with epoxy | 0 | 0 | 0 |
| 2 (Control) | PF Resin with epoxy | 0 | 0.2 | 0 |
| 3 (Control) | PF Resin with epoxy | 0 | 1.0 | 0 |
| 4 (Control) | PF Resin | 0 | 0 | 8 |
| 5 | Alkoxylated PF Resin with epoxy | 50 | 0 | 0 |
| 6 | Alkoxylated PF Resin with epoxy | 10 | 0 | 0 |
| 7 | Alkoxylated PF Resin with epoxy | 50 | 0 | 3 |
| 8 | Alkoxylated PF Resin with epoxy | 10 | 0 | 3 |

Table 1 illustrates the differences between the control samples and the examples containing partially alkoxylated PF Resin where alkoxylation can range between 10-50% of the total reactive sites on the PF Resin, hexa can vary between 0 and 3% of the total composition, and 2-MI is 0% for the examples and up to 1% for the controls.

Table 2 illustrate the results from the DSC series of tests.

TABLE 2

| Examples | Onset Temperature (° C.) | Peak Exothermic Temperature (° C.) | Enthalpy (kJ) | Tg after full cure (° C.) |
|---|---|---|---|---|
| 1 | 230.1 | 368.3 | N/A | 132.8 |
| 2 | 136.0 | 173.1 | 159.2 | 143.0 |
| 3 | 118.9 | 147.5 | 124.0 | 135.6 |
| 5 | 153.7 | 194.9 | 125.0 | 128.4 |
| 6 | 189.3 | 230.3 | 144.2 | 159.8 |

Based on the results shown in Table 2 for the DSC data, the following benefits of the invention were observed.

Alkoxylated novolac-epoxy begins to cure at 154° C. compared to standard PF Resin-epoxy which starts to cure at 230° C. Therefore, alkoxylated novolacs allow curing to start about 75° C. lower than standard PF Resin (comparing onset temperature for Examples 1 and 5).

Alkoxylated novolac-epoxy has peak cure temperature of 195° C. compared to standard PF Resin-epoxy which cures at peak temperature of 368° C. Therefore, alkoxylated novolacs cure is about 173° C. lower than standard PF Resin (comparing peak temperature for Examples 1 and 5).

Alkoxylated novolacs also show much higher glass transition temperature than control PF Resins when cured with epoxies (comparing glass transition temperature for Examples 1 and 6).

Alkoxylated novolac-epoxy system show higher glass transition temperature when compared to standard PF-epoxy system containing 2-MI as catalyst (comparing peak temperature for Examples 2 and 6).

Table 3 illustrates degradation and Char results.

TABLE 3

| Examples | % Alkoxylation | Catalyst (2-Methyl Imidazole) | Hexa (%) | Degradation Temp (° C.) 5% | 10% | Peak | Char at 800° C. |
|---|---|---|---|---|---|---|---|
| 1 | 0 | 0 | 0 | N/A | N/A | N/A | N/A |
| 2 | 0 | 0.2 | 0 | 392 | 408 | 424 | 54 |
| 5 | 50 | 0 | 0 | 380 | 396 | 424 | 40 |
| 6 | 10 | 0 | 0 | 360 | 384 | 409 | 29 |
| 7 | 50 | 0 | 3 | 389 | 404 | 422 | 44 |
| 8 | 10 | 0 | 3 | 364 | 390 | 419 | 30 |
| 4 | 0 | 0 | 8 | 315 | 374 | 377, 537 | 57 |

Based on the results shown in Table for the thermogravimetric analysis data it was observed that the partially alkoxylated resin/epoxy systems overall exhibited higher stability at temperatures above 30° C. compared to traditional PF-hexa cured systems (Example 4) and did not start degrading until 360° C., which is a minimum increase of the onset of degradation by 14%. A similar effect is observed at 10% mass loss where partially alkoxylated resins exhibited a minimum increase of the onset of degradation by 8.5% (compared to Example 4). The char yield at 800° C. is an indication of the material's ability to produce intumescent char or a material that is leftover after extreme exposure to heat. While the partially alkoxylated novolacs exhibited a lower tendency to form char they were still relatively high compared to most pure phenolic epoxy resin systems which typically exhibit char yields of 10% or lower.

Table 4 illustrates Dynamic Curing Rheology Results

TABLE 4

| Examples | Minimum Viscosity Temperature (° C.) | Gel Point Temperature (° C.) | Gel Time (sec) | Shear Modulus at 250° C. |
|---|---|---|---|---|
| 1 | 162.3 | 180.6 | 2416 | $1.83 \times 10^4$ |
| 2 | 113 | 125.5 | 770 | $3.64 \times 10^6$ |
| 3 | 103 | 109.5 | 282 | $3.36 \times 10^6$ |
| 5 | 135 | 145.6 | 1368 | $5.03 \times 10^6$ |
| 6 | 144 | 157.6 | 1726 | $5.72 \times 10^6$ |

Based on the results shown in Table 4 for the rheology data, the following benefits of the invention were observed. An improved modulus property was observed from alkoxylated novolac-epoxy systems compared to the control PF-epoxy system (with or without catalyst) (comparing the Shear Modulus at 250° C.). An improved, faster gel time for alkoxylated novolac-epoxy system was observed as compared to the control PF-epoxy system (without catalyst) (comparing Gel Time of Example 1 with Example 5 and Example 6). An advantageous gel point temperature reduction for alkoxylated novolac-epoxy system was observed compared to the control PF-epoxy system (without catalyst) (comparing Gel Point temperature of Example 1 with Example 5 and Example 6).

Table 5 illustrates Isothermal Rheology Results

TABLE 5

| Examples | Gel at 90° C. (s) | Gel at 100° C. (s) | Gel at 110° C. (s) | Gel at 120° C. (s) | Gel at 130° C. (s) | Gel at 140° C. (s) |
|---|---|---|---|---|---|---|
| 2 | N/A | >10000 | 1656 | 455 | 104 | 0 |
| 4 | N/A | >10000 | 5172 | 2081 | 166 | 88 |
| 5 | N/A | >10000 | 5386 | 2056 | 959 | 484 |
| 6 | N/A | >10000 | >10000 | 5194 | 2422 | 1270 |
| 7 | 3133 | 1657 | 848 | 50 | Already Gelled | Already Gelled |
| 8 | 3779 | 1696 | 675 | 121 | Already Gelled | Already Gelled |

Based on the results shown in Table 5 for the rheology data, the following benefits of the invention were observed. An improved processing of partially alkoxylated novolac-epoxy system over temperature range of 90° C. to 140° C. compared to standard novolac-epoxy system with 2-MI catalysts of a commercially available novolac system. Additional features of partially alkoxylated novolac-epoxy systems is also that gelation can be achieved faster at lower temperatures, which can result in faster output of finished parts where a partially alkoxylated novolac-epoxy system is used. Faster output of finished parts can result in increased productivity for many processes that traditionally use phenolic resins as a binder.

Table 6 illustrates DMA Data

TABLE 6

| Examples | % Alkoxylation | Catalyst (2-Methyl Imidazole) | Hexa (%) | Tg by Loss Modulus (° C.) | Tg by Tan δ (° C.) | Initial Modulus (MPa) | Rubbery Modulus (MPa) |
|---|---|---|---|---|---|---|---|
| 1 | 0 | 0 | 0 | N/A | N/A | N/A | N/A |
| 2 | 0 | 0.2 | 0 | 160 | 199 | 2954 | 106 |
| 3 | 0 | 1 | 0 | N/A | N/A | N/A | N/A |

TABLE 6-continued

| Examples | % Alkoxylation | Catalyst (2-Methyl Imidazole) | Hexa (%) | Tg by Loss Modulus (° C.) | Tg by Tan δ (° C.) | Initial Modulus (MPa) | Rubbery Modulus (MPa) |
|---|---|---|---|---|---|---|---|
| 4 | 0 | 0 | 8 | 165 | 180 | 3457 | 91 |
| 5 | 50 | 0 | 0 | 146 | 160 | 2691 | 38 |
| 6 | 10 | 0 | 0 | 143 | 161 | 3054 | 42 |
| 7 | 50 | 0 | 3 | 140 | 183 | 2927 | 61 |
|  | 10 | 0 | 3 | 139 | 163 | 3276 | 39 |

Based on the results shown in Table 6 for the DMA data, the following benefits of the invention were observed. A lower $T_\alpha$ and lower rubbery modulus of examples 5-8 indicate less crosslink density and thus indicate gains in better fracture toughness compared to standard novolac-epoxy systems and commercially available novolac powder systems (Example 4). Increased fracture toughness is beneficial in articles that require resistance to crack propagation and is a critical property for such articles as grinding wheels, brake pads, brake drum linings, non-woven composites, and woven composites.

While the present invention has been described and illustrated by reference to particular embodiments, those of ordinary skill in the art will appreciate that the invention lends itself to variations not necessarily illustrated herein.

What is claimed is:

1. A composition consisting essentially of:
   an epoxy resin component; and
   a partially alkoxylated phenol-aldehyde novolac resin, and
   an optional curing agent, wherein the composition is a powder.

2. The composition of claim 1, wherein the epoxy resin component comprises an epoxy group functionality equal or greater than 2.

3. The composition of claim 1, wherein the composition consists essentially of:
   from 20 wt. % to 70 wt. % of the epoxy resin component; and
   from 30 wt. % to 80 wt. % of the partially alkoxylated phenol-aldehyde novolac resin; and
   from 0 wt. % to 5 wt. % of the optional curing agent, wherein the total weight percent is 100 weight percent.

4. The composition of claim 1, wherein the optional curing agent is selected from the group consisting of hexamethylenetetramine, oxazolidine, paraformaldehyde, trioxane, 2-methyl imidazole, imidazole, melamine, triethanol amine, tributyl amine, and combinations thereof.

5. The composition of claim 1, wherein the optional curing agent is present in the composition and comprises from 0.1 wt. % to 5 wt. % of the composition.

6. A composition consisting essentially of:
   an epoxy resin component; and
   a partially alkoxylated phenol-aldehyde novolac resin, and
   an optional curing agent, wherein the partially alkoxylated phenol-aldehyde novolac resin comprises a reaction product from components comprising:
      a phenol-aldehyde novolac resin; and
      an alkoxylation agent selected from the group consisting of an alkylene oxide, an alkylene carbonate, and a combination thereof; and
      an optional alkoxylation catalyst, wherein a molar ratio of the alkoxylation agent to phenolic hydroxyl group reactive sites of the phenol-aldehyde novolac resin is from 0.1:1 to 0.9:1 to form the partially alkoxylated phenol-aldehyde novolac resin.

7. The composition of claim 6, wherein the composition is a powder.

8. The composition of claim 6, wherein 10% to 50% of the phenolic hydroxyl group reactive sites of the phenol-aldehyde novolac resin are alkoxylated, the reaction product comprises a hydroxyl group functionality equal or greater than 2, or a combination thereof.

9. The composition of claim 6, wherein the reaction product comprises a reaction product from components comprising:
   from 59 wt. % to 90 wt. % of the phenol-aldehyde novolac resin; and
   from 10 wt. % to 41 wt. % of the alkoxylation agent; and
   from 0 wt. % to 5 wt. % of the optional catalyst, wherein the total weight percent is 100 weight percent.

10. The composition of claim 9, wherein the optional catalyst is present in the amount from 0.05 wt. % to 5 wt. %.

11. The composition of claim 6, wherein the alkylene oxide comprises a compound selected from the group consisting of ethylene oxide, propylene oxide, butylene oxide, and combinations thereof and wherein the alkylene carbonate comprises a compound selected from the group consisting of ethylene carbonate, propylene carbonate, butylene carbonate, and combinations thereof.

12. The composition of claim 6, wherein the composition is a liquid.

13. A process comprising:
   reacting a phenol-aldehyde novolac resin and an alkoxylation agent selected from the group consisting of an alkylene oxide, an alkylene carbonate, and a combination thereof, and an optional alkoxylation catalyst to form a partially alkoxylated phenol-aldehyde novolac resin; and
   mixing the partially alkoxylated phenol-aldehyde novolac resin and an epoxy resin component and an optional curing agent to form a composition consisting essentially of: the epoxy resin component and the partially alkoxylated phenol-aldehyde novolac resin, and optionally the curing agent, wherein:
   the composition is a powder,
   a molar ratio of the alkoxylation agent to phenolic hydroxyl group reactive sites of the phenol-aldehyde novolac resin is from 0.1:1 to 0.9:1 to form the partially alkoxylated phenol-aldehyde novolac resin, or
   the composition is a powder and a molar ratio of the alkoxylation agent to phenolic hydroxyl group reactive sites of the phenol-aldehyde novolac resin is from 0.1:1 to 0.9:1 to form the partially alkoxylated phenol-aldehyde novolac resin.

14. The process of claim 13, wherein the partially alkoxylated phenol-aldehyde novolac resin and the epoxy resin component are mixed at room temperature to form the composition.

15. The process of claim 13, wherein the partially alkoxylated phenol-aldehyde novolac resin and the epoxy resin component are mixed by grinding, blending, or a combination thereof to form the composition.

16. The process of claim 13, wherein mixing the partially alkoxylated phenol-aldehyde novolac resin and the epoxy resin component is performed in the presence of the curing agent.

17. The process of claim 13, wherein 10% to 50% of the phenolic hydroxyl group reactive sites of the phenol-aldehyde novolac resin are alkoxylated and the partially alkoxylated phenol-aldehyde novolac resin comprises a hydroxyl group functionality equal or greater than 2.

18. The process of claim 13, wherein reacting the phenol-aldehyde novolac resin and the alkoxylation agent is performed in the presence of the alkoxylation catalyst.

19. The process of claim 13, wherein the composition is in liquid or solid form.

20. The process of claim 13, further comprising applying the composition as a composite, a liquid coating, a hot melt adhesive, a molding powder, a powder coating, or combinations thereof.

\* \* \* \* \*